United States Patent
Vogel

(10) Patent No.: US 10,066,159 B2
(45) Date of Patent: Sep. 4, 2018

(54) COMPOSITE NANOPARTICLES INCLUDING A PHTHALIC ACID DERIVATIVE

(71) Applicant: 3M INNOVATIVE PROPERTIES COMPANY, St. Paul, MN (US)

(72) Inventor: Dennis E. Vogel, Lake Elmo, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 175 days.

(21) Appl. No.: 15/100,811

(22) PCT Filed: Dec. 2, 2014

(86) PCT No.: PCT/US2014/068187
§ 371 (c)(1),
(2) Date: Jun. 1, 2016

(87) PCT Pub. No.: WO2015/094646
PCT Pub. Date: Jun. 25, 2015

(65) Prior Publication Data
US 2016/0298029 A1    Oct. 13, 2016

Related U.S. Application Data

(60) Provisional application No. 61/916,967, filed on Dec. 17, 2013.

(51) Int. Cl.
C09K 11/02 (2006.01)
C09K 11/88 (2006.01)
(Continued)

(52) U.S. Cl.
CPC ........... C09K 11/025 (2013.01); C09K 11/02 (2013.01); C09K 11/565 (2013.01); C09K 11/70 (2013.01);
(Continued)

(58) Field of Classification Search
CPC ....... C09K 11/02; C09K 11/025; C09K 11/70; C09K 11/883; C09K 11/565; B82Y 20/00; B82Y 30/00; B82Y 40/00
(Continued)

(56) References Cited

U.S. PATENT DOCUMENTS 6,306,736 B1   10/2001   Alivisatos
7,160,613 B2   1/2007    Bawendi
(Continued)

FOREIGN PATENT DOCUMENTS

WO   WO 2010-039897   4/2010
WO   WO 2015-095032   6/2015

OTHER PUBLICATIONS

Achimovicova, "The use of de-aggregating agents in ZnSe mechanochemical synthesis", Journal Of Materials Science: Materials Electronics, 2013, vol. 24, No. 10, pp. 3686-3593.
(Continued)

Primary Examiner — Matthew E Hoban
Assistant Examiner — Lynne Edmondson
(74) Attorney, Agent, or Firm — Lisa P. Fulton; Kent S. Kokko

(57) ABSTRACT

A composite particle that includes: a fluorescent semiconductor core/shell nanoparticle (preferably, nanocrystal); and a phthalic acid derivative attached to the core/shell nanoparticle outer surface, wherein the phthalic acid derivative (prior to attachment to the nanoparticle) has the following Formula (I): wherein each R is independently a linear or branched alkyl group having 6 or more carbon atoms and wherein n is 1 or 2.

(Continued)

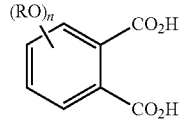

(I)

21 Claims, 1 Drawing Sheet

(51) Int. Cl.
*C09K 11/56* (2006.01)
*C09K 11/70* (2006.01)
*B82Y 20/00* (2011.01)

(52) U.S. Cl.
CPC ............ *C09K 11/883* (2013.01); *B82Y 20/00* (2013.01); *Y10S 977/774* (2013.01); *Y10S 977/95* (2013.01)

(58) Field of Classification Search
USPC ..................................................... 252/301.36
See application file for complete search history.

(56) References Cited

U.S. PATENT DOCUMENTS

| | | | |
|---|---|---|---|
| 7,557,028 B1 | 7/2009 | Scher | |
| 8,062,967 B1 | 11/2011 | Scher | |
| 8,071,359 B2 | 12/2011 | Weiss | |
| 8,283,412 B2 | 10/2012 | Liu | |
| 2004/0095658 A1* | 5/2004 | Buretea | B82Y 20/00 359/853 |
| 2009/0212258 A1 | 8/2009 | McCairn | |
| 2010/0068522 A1 | 3/2010 | Pickett | |
| 2010/0279094 A1* | 11/2010 | Wu | G03G 15/162 428/220 |
| 2010/0283014 A1 | 11/2010 | Breen | |

OTHER PUBLICATIONS

Dabbousi, "(CdSe)ZnS Core-Shell Quantum Dots: Synthesis and Characterization of a Size Series of Highly Luminescent Nanocrystallites", The Journal of Physical Chemistry B, 1997, vol. 101, No. 46, pp. 9463-9475.

Hines, "Synthesis and Characterization of strongly luminescing ZnS-Capped CdSe Nanocrystals", The Journal of Physical Chemistry, 1996, vol. 100, No. 2, pp. 468-471.

Kokuoz, "Organic-inorganic hybrid nanoparticles with enhanced rare-earth emissions", Optical Materials, 2009, vol. 31, No. 9, pp. 1327-1330.

Zhu, "Controlling Charge Separation and Recombination Rates in CdSe/ZnS Type I Core-Shell Quantum Dots by Shell Thicknesses", Journal Of The American Chemical Society, Oct. 2010, vol. 132, No. 42, pp. 15038-15045.

International Search Report For PCT International Application No. PCT/US2014/068187, dated Apr. 14, 2015, 4pgs.

* cited by examiner

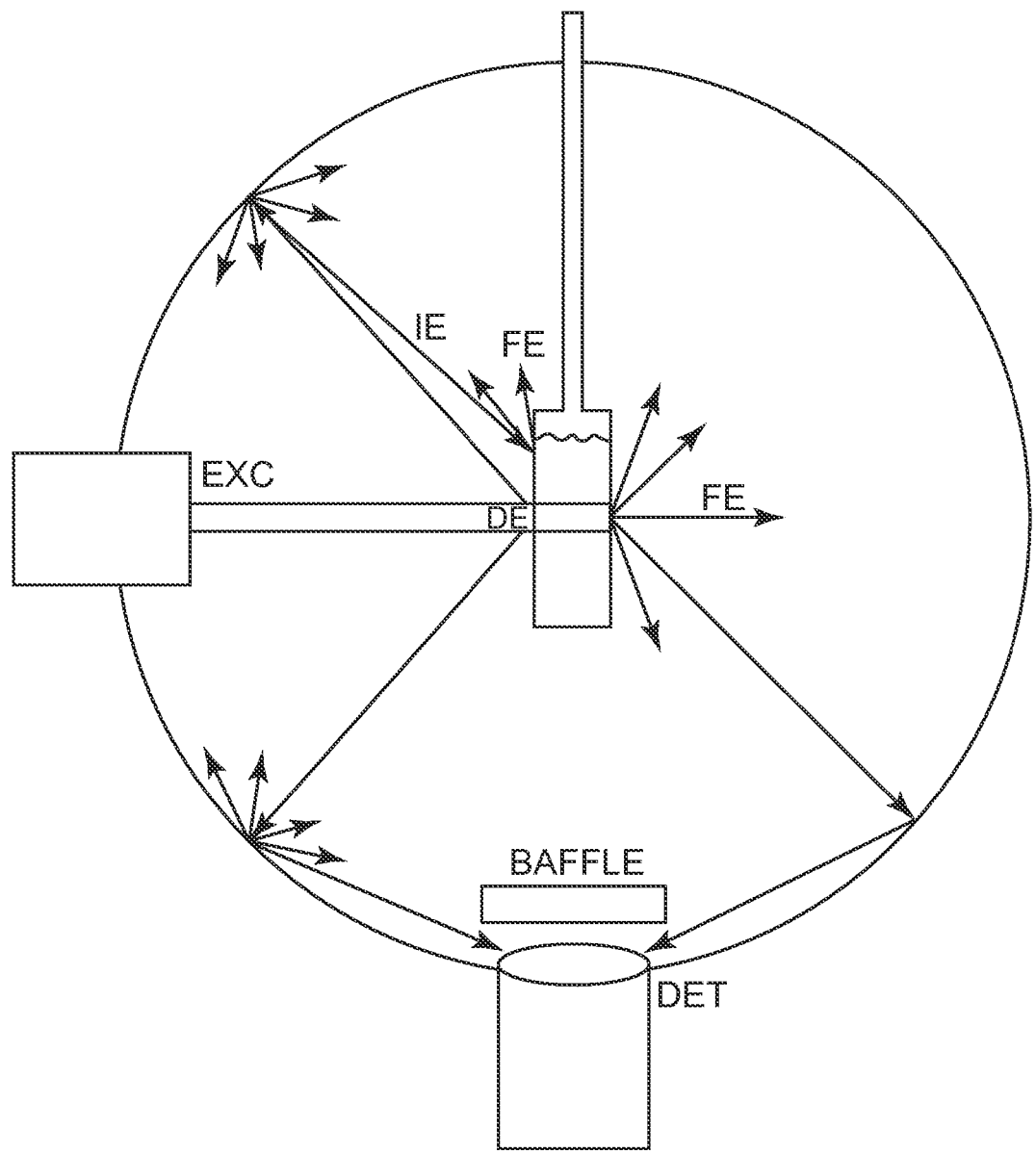

COMPOSITE NANOPARTICLES INCLUDING A PHTHALIC ACID DERIVATIVE

BACKGROUND

Quantum Dot Enhancement Films (QDEF) are used as the light source for LCD displays. Red and green quantum dots are used in QDEF with a blue LED as the light source to give the full spectrum of colors. This has the advantage of improving the color gamut over the typical LCD display and keeping the energy consumption low compared to LED displays.

Once the quantum dots are synthesized, they are treated with an organic ligand that binds to the exterior surface of the quantum dot. Colloidal quantum dot nanoparticles (preferably, nanocrystals) that are stabilized with organic ligands can have improved quantum yields due to passivating surface traps, controlling dispersion stability in solvent or polymer matrix, stabilizing against aggregation and degradation, and influencing the kinetics of nanoparticle (preferably, nanocrystal) growth during synthesis. Therefore, optimizing the organic ligand is important for achieving optimal quantum yield, processability, and functional lifetime in QDEF.

SUMMARY

Composite particles are provided that are capable of fluorescence and suitable for use in quantum dot enhancement films.

In one aspect, the present disclosure provides a composite particle that includes: a fluorescent semiconductor core/shell nanoparticle (preferably, nanocrystal); and a phthalic acid derivative attached to the core/shell nanoparticle outer surface. The phthalic acid derivative (prior to attachment to the nanoparticle) has the following Formula (I).

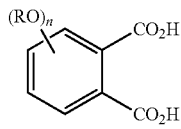

In Formula (I), each R is independently a linear or branched alkyl group having 6 or more carbon atoms; and n is 1 or 2. In one aspect, the present disclosure provides a composite particle that includes: a fluorescent semiconductor core/shell nanoparticle (preferably, nanocrystal); and a phthalic acid derivative attached to the core/shell nanoparticle outer surface. The fluorescent semiconductor core/shell nanoparticle includes: an InP core; an inner shell overcoating the core, wherein the inner shell includes zinc selenide and zinc sulfide; and an outer shell overcoating the inner shell, wherein the outer shell includes zinc sulfide. The phthalic acid derivative (prior to attachment to the nanoparticle) has the following Formula (I).

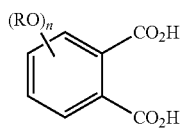

In Formula (I), each R is independently a linear or branched alkyl group having 6 or more carbon atoms; and n is 1 or 2.

The composite particles can be used in coatings and films for use in optical displays. The fluorescent semiconductor nanoparticles emit a fluorescence signal at a second wavelength of light when excited by a first wavelength of light that is shorter than the second wavelength of light.

The term "composite particle" as used herein refers to a nanoparticle, which is typically in the form of a core/shell nanoparticle (preferably, nanocrystal), having any associated organic coating or other material on the surface of the nanoparticle that is not removed from the surface by ordinary solvation. Such composite particles are useful as "quantum dots," which have a tunable emission in the near ultraviolet (UV) to far infrared (IR) range as a result of the use of a semiconductor material.

The term "nanoparticle" refers to a particle having an average particle diameter in the range of 0.1 to 1000 nanometers such as in the range of 0.1 to 100 nanometers or in the range of 1 to 100 nanometers. The term "diameter" refers not only to the diameter of substantially spherical particles but also to the distance along the smallest axis of the structure. Suitable techniques for measuring the average particle diameter include, for example, scanning tunneling microscopy, light scattering, and transmission electron microscopy.

A "core" of a nanoparticle is understood to mean a nanoparticle (preferably, a nanocrystal) to which no shell has been applied or to the inner portion of a core/shell nanoparticle. A core of a nanoparticle can have a homogenous composition or its composition can vary with depth inside the core. Many materials are known and used in core nanoparticles, and many methods are known in the art for applying one or more shells to a core nanoparticle. The core has a different composition than the one more shells. The core typically has a different chemical composition than the shell of the core/shell nanoparticle.

As used herein, the term "actinic radiation" refers to radiation in any wavelength range of the electromagnetic spectrum. The actinic radiation is typically in the ultraviolet wavelength range, in the visible wavelength range, in the infrared wavelength range, or combinations thereof. Any suitable energy source known in the art can be used to provide the actinic radiation.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of about 20° C. to about 25° C. or about 22° C. to about 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE FIGURES

FIG. 1 is a schematic of the system for obtaining absolute quantum yield (QY) measurements in a modified integrating sphere using the Hamamatsu Quantaurus spectrometer.

DETAILED DESCRIPTION OF ILLUSTRATIVE EMBODIMENTS

The present disclosure provides composite particles that contain fluorescent semiconductor nanoparticles that can fluoresce when excited with actinic radiation. The composite particles can be used in coatings and films for use in optical displays.

Fluorescent semiconductor nanoparticles emit a fluorescence signal when suitably excited. They fluoresce at a second wavelength of actinic radiation when excited by a first wavelength of actinic radiation that is shorter than the second wavelength. In some embodiments, the fluorescent semiconductor nanoparticles can fluoresce in the visible region of the electromagnetic spectrum when exposed to wavelengths of light in the ultraviolet region of the electromagnetic spectrum. In other embodiments, the fluorescent semiconductor nanoparticles can fluoresce in the infrared region when excited in the ultraviolet or visible regions of the electromagnetic spectrum. In still other embodiments, the fluorescent semiconductor nanoparticles can fluoresce in the ultraviolet region when excited in the ultraviolet region by a shorter wavelength of light, can fluoresce in the visible region when excited by a shorter wavelength of light in the visible region, or can fluoresce in the infrared region when excited by a shorter wavelength of light in the infrared region. The fluorescent semiconductor nanoparticles are often capable of fluorescing in a wavelength range such as, for example, at a wavelength up to 1200 nanometers (nm), or up to 1000 nm, up to 900 nm, or up to 800 nm. For example, the fluorescent semiconductor nanoparticles are often capable of fluorescence in the range of 400 to 800 nanometers.

The nanoparticles have an average particle diameter of at least 0.1 nanometer (nm), or at least 0.5 nm, or at least 1 nm. The nanoparticles have an average particle diameter of up to 1000 nm, or up to 500 nm, or up to 200 nm, or up to 100 nm, or up to 50 nm, or up to 20 nm, or up to 10 nm. Semiconductor nanoparticles, particularly with sizes on the scale of 1-10 nm, have emerged as a category of the most promising advanced materials for cutting-edge technologies.

Semiconductor materials include elements or complexes of Group 2-Group 16, Group 12-Group 16, Group 13-Group 15, Group 14-Group 16, and Group 14 semiconductors of the Periodic Table (using the modern group numbering system of 1-18). Some suitable quantum dots include a metal phosphide, a metal selenide, a metal telluride, or a metal sulfide. Exemplary semiconductor materials include, but are not limited to, Si, Ge, Sn, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, MgTe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Ga,In)_2(S,Se,Te)_3$, $Al_2CO$, CaS, CaSe, CaTe, SrS, SrSe, SrTe, BaS, BaSe, BaTe, and an appropriate combination of two or more such semiconductors. These semiconductor materials can be used for the core, the one or more shell layers, or both.

In certain embodiments, exemplary metal phosphide quantum dots include indium phosphide and gallium phosphide, exemplary metal selenide quantum dots include cadmium selenide, lead selenide, and zinc selenide, exemplary metal sulfide quantum dots include cadmium sulfide, lead sulfide, and zinc sulfide, and exemplary metal telluride quantum dots include cadmium telluride, lead telluride, and zinc telluride. Other suitable quantum dots include gallium arsenide and indium gallium phosphide. Exemplary semiconductor materials are commercially available from Evident Technologies (Troy, N.Y.).

For many applications of quantum dots, two factors are typically considered in selecting a material. The first factor is the ability to absorb and emit visible light. This consideration makes InP a highly desirable base material. The second factor is the material's photoluminescence efficiency (quantum yield). Generally, Group 12-Group 16 quantum dots (such as cadmium selenide) have higher quantum yield than Group 13-Group 15 quantum dots (such as InP). The quantum yield of InP cores produced previously has been very low (<1%), and therefore the production of a core/shell structure with InP as the core and another semiconductor compound with higher bandgap (e.g., ZnS) as the shell has been pursued in attempts to improve the quantum yield.

Thus, the fluorescent semiconductor nanoparticles (i.e., quantum dots) of the present disclosure include a core and a shell at least partially surrounding the core. The core/shell nanoparticles can have two distinct layers, a semiconductor or metallic core and a shell surrounding the core of an insulating or semiconductor material. The core often contains a first semiconductor material and the shell often contains a second semiconductor material that is different than the first semiconductor material. For example, a first Group 12-Group 16 (e.g., CdSe) semiconductor material can be present in the core and a second Group 12-Group 16 (e.g., ZnS) semiconductor material can be present in the shell.

In certain embodiments of the present disclosure, the core includes a metal phosphide (e.g., indium phosphide (InP), gallium phosphide (GaP), aluminum phosphide (AlP)), a metal selenide (e.g., cadmium selenide (CdSe), zinc selenide (ZnSe), magnesium selenide (MgSe)), or a metal telluride (e.g., cadmium telluride (CdTe), zinc telluride (ZnTe)). In certain embodiments, the core includes a metal phosphide (e.g., indium phosphide) or a metal selenide (e.g., cadmium selenide). In certain preferred embodiments of the present disclosure, the core includes a metal phosphide (e.g., indium phosphide).

The shell can be a single layer or multilayered. In some embodiments, the shell is a multilayered shell. The shell can include any of the core materials described herein. In certain embodiments, the shell material can be a semiconductor material having a higher bandgap energy than the semiconductor core. In other embodiments, suitable shell materials can have good conduction and valence band offset with respect to the semiconductor core, and in some embodiments, the conduction band can be higher and the valence band can be lower than those of the core. For example, in certain embodiments, semiconductor cores that emit energy in the visible region such as, for example, CdS, CdSe, CdTe, ZnSe, ZnTe, GaP, InP, or GaAs, or near IR region such as, for example, InP, InAs, InSb, PbS, or PbSe may be coated with a shell material having a bandgap energy in the ultraviolet regions such as, for example, ZnS, GaN, and magnesium chalcogenides such as MgS, MgSe, and MgTe. In other embodiments, semiconductor cores that emit in the near IR region can be coated with a material having a bandgap energy in the visible region such as CdS or ZnSe. Formation of the core/shell nanoparticles may be carried out by a variety of methods. Suitable core and shell precursors useful for preparing semiconductor cores are known in the art and can include Group 2 elements, Group 12 elements, Group 13 elements, Group 14 elements, Group 15 elements, Group 16 elements, and salt forms thereof. For example, a first precursor may include metal salt (M+X−) including a metal atom (M+) such as, for example, Zn, Cd, Hg, Mg, Ca, Sr, Ba, Ga, In, Al, Pb, Ge, Si, or in salts and a counter ion (X−), or organometallic species such as, for example, dialkyl metal complexes. The preparation of a coated semiconductor nanocrystal core and core/shell nanocrystals can be found in, for example, Dabbousi et al. (1997) *J. Phys. Chem. B* 101:9463, Hines et al. (1996) *J. Phys. Chem.* 100: 468-471, and Peng et al. (1997) *J. Amer. Chem. Soc.* 119:7019-7029, as well as in U.S. Pat. No. 8,283,412 (Liu et al.) and International Publication No. WO 2010/039897 (Tulsky et al.).

In certain preferred embodiments of the present disclosure, the shell includes a metal sulfide (e.g., zinc sulfide or cadmium sulfide). In certain embodiments, the shell includes a zinc-containing compound (e.g., zinc sulfide or zinc selenide). In certain embodiments, a multilayered shell includes an inner shell overcoating the core, wherein the inner shell includes zinc selenide and zinc sulfide. In certain embodiments, a multilayered shell includes an outer shell overcoating the inner shell, wherein the outer shell includes zinc sulfide.

In some embodiments, the core of the shell/core nanoparticle contains a metal phosphide such as indium phosphide, gallium phosphide, or aluminum phosphide. The shell contains zinc sulfide, zinc selenide, or a combination thereof. In some more particular embodiments, the core contains indium phosphide and the shell is multilayered with the inner shell containing both zinc selenide and zinc sulfide and the outer shell containing zinc sulfide.

The thickness of the shell(s) may vary among embodiments and can affect fluorescence wavelength, quantum yield, fluorescence stability, and other photostability characteristics of the nanocrystal. The skilled artisan can select the appropriate thickness to achieve desired properties and may modify the method of making the core/shell nanoparticles to achieve the appropriate thickness of the shell(s).

The diameter of the fluorescent semiconductor nanoparticles (i.e., quantum dots) of the present disclosure can affect the fluorescence wavelength. The diameter of the quantum dot is often directly related to the fluorescence wavelength. For example, cadmium selenide quantum dots having an average particle diameter of about 2 to 3 nanometers tend to fluoresce in the blue or green regions of the visible spectrum while cadmium selenide quantum dots having an average particle diameter of about 8 to 10 nanometers tend to fluoresce in the red region of the visible spectrum.

The fluorescent semiconductor nanoparticles are surface-modified with a surface modifying agent to enhance their dispersibility in a liquid. That is, the surface modifying agent tends to increase compatibility of the fluorescent semiconductor nanoparticles with a non-aqueous solvent, and any other components of a composition (e.g., a polymeric material, precursors of the polymeric material, or combinations thereof).

Surface modification involves combining the fluorescent semiconductor nanoparticles with a surface modifying agent or combination of surface modifying agents that attach to the surface of the fluorescent semiconductor nanoparticles and that modify the surface characteristics of the fluorescent semiconductor nanoparticles. In this context, "attach" or "attached" refers to the association between the surface modifying agent and the fluorescent semiconductor nanoparticle, which is of sufficient stability for the surface modified particles to be suitable for their intended use. The association may be physical (e.g., by absorption or adsorption), chemical (e.g., through covalent bonds, ionic bonds, hydrogen bonds), or a combination thereof.

Surface modifying agents include one or more groups for attaching to the surface of the fluorescent semiconductor nanoparticles and one or more group for various functions, such as compatibilizing the particles with a solvent, improving the quantum yield of the material. The groups attach to the surface, for example, by adsorption, absorption, formation of an ionic bond, formation of a covalent bond, formation of a hydrogen bond, or a combination thereof.

Quantum efficiency (also known in the literature as quantum yield) is the number of defined events which occur per photon absorbed (e. g., the number of photons emitted by the nanoparticles per photon absorbed by the nanoparticles). Accordingly, one general embodiment of the present disclosure provides a population of nanoparticles that displays a quantum efficiency of 45% or greater, or 50% or greater, or 55% or greater, or 60% or greater.

Surface modifying agents useful in the present disclosure are phthalic acid derivatives. Such compounds (prior to attachment to the nanoparticle) have the following Formula (I):

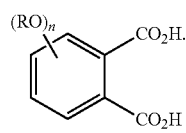

In certain embodiments, the phthalic acid derivative (prior to attachment to the nanoparticle) has the following Formula (II):

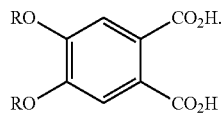

In certain embodiments, the phthalic acid derivative (prior to attachment to the nanoparticle) has the following Formula (III):

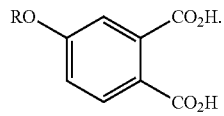

In compounds of these formulas, each R is independently a linear or branched alkyl group having 6 or more carbon atoms.

In certain embodiments, each R is independently a linear or branched alkyl group having up to 20 carbon atoms. In certain embodiments, each R is independently a linear or branched alkyl group having up to 15 carbon atoms. Each R typically has at least 3 carbon atoms, at least 4 carbon atoms, at least 6 carbon atoms, at least 8 carbon atoms, or at least 10 carbon atoms.

In certain embodiments, each R is independently a branched alkyl group. In certain embodiments, each R is independently a linear alkyl group.

In certain embodiments of the phthalic acid derivative of Formula (I), n is 1 or 2. In certain embodiments of the phthalic acid derivative of Formula (I), n is 1. In certain embodiments of the phthalic acid derivative of Formula (I), n is 2. In certain embodiments of the phthalic acid derivative of Formula (I), when n is 2, each OR group is the same.

In certain embodiments, the phthalic acid derivative is liquid at room temperature. In certain embodiments, the phthalic acid derivative is soluble in a nonpolar organic solvent (e.g., alkanes, alkenes such as octadecene, aromatic hydrocarbons such as toluene) at room temperature in an amount of at least 1 wt-%.

In certain embodiments, the phthalic acid derivative comprises a mixture of compounds of Formula (I).

In certain embodiments, the phthalic acid derivative is selected from the following compounds (IV), (V), and (VI), respectively:

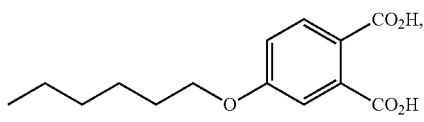

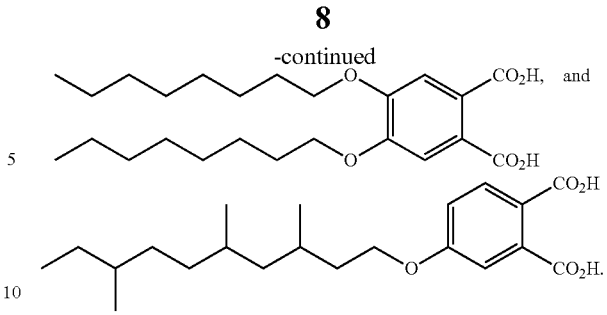

It should be noted that the last of these structures (VI) is a representative structure of a mixture of isomers.

Various methods can be used to surface modify the fluorescent semiconductor nanoparticles. In some embodiments, procedures similar to those described in U.S. Pat. No. 7,160,613 (Bawendi et al.) and U.S. Pat. No. 8,283,412 (Liu et al.) can be used to add the surface modifying agent. For example, the surface modifying agent and the fluorescent semiconductor nanoparticles can be heated at an elevated temperature (e.g., at least 50° C., at least 60° C., at least 80° C., or at least 90° C.) for an extended period of time (e.g., at least 1 hour, at least 5 hours, at least 10 hours, at least 15 hours, or at least 20 hours).

If desired, any by-product of the synthesis process or any solvent used in surface-modification process can be removed, for example, by distillation, rotary evaporation, or by precipitation of the nanoparticles and centrifugation of the mixture followed by decanting the liquid and leaving behind the surface-modified nanoparticles. In some embodiments, the surface-modified fluorescent semiconductor nanoparticles are dried to a powder after surface-modification. In other embodiments, the solvent used for the surface modification is compatible (i.e., miscible) with any polymeric materials and/or precursors of the polymeric material used in compositions in which the nanoparticles are included. In these embodiments, at least a portion of the solvent used for the surface-modification reaction can be included in the solution in which the surface-modified, fluorescent semiconductor nanoparticles are dispersed.

The surface modifying agent functions at least in part to reduce the number of aggregated fluorescent semiconductor nanoparticles within the dispersion composition. The formation of aggregated fluorescent semiconductor nanoparticles can alter the fluorescent characteristics of the dispersion composition. As used herein, the term "aggregated" or "aggregation" refers to clusters or clumps of fluorescent semiconductor nanoparticles that are firmly associated with one another. Separation of aggregated particles typically requires high shear. In contrast, "agglomeration" or "agglomerated" refers to a combination or cluster of nanoparticles that is often attributable to the neutralization of electric charges. Agglomeration is typically reversible with moderate shear or by selection of a more compatible solvent.

The surface modifying agent is added in an amount sufficient to minimize aggregation of the fluorescent semiconductor nanoparticles and to form a dispersion composition that remains in the dispersed state for a useful period of time without substantial agitation of the dispersion or that can be easily dispersed again with minimal energy input. Without wishing to be bound by theory, the surface modifying agent is believed to sterically inhibit the aggregation of the fluorescent semiconductor nanoparticles. Preferably, the surface treatment does not interfere with the fluorescence of the semiconductor nanoparticles.

Composite nanoparticles (i.e., surface-modified, fluorescent semiconductor nanoparticles) of the present disclosure can be used in conventional electronics, semiconductor devices, electrical systems, optical systems, consumer electronics, industrial or military electronics, and nanocrystal, nanowire (NW), nanorod, nanotube, and nanoribbon technologies.

The surface-modified, fluorescent semiconductor nanoparticles may be dispersed in a solution that contains (a) a non-aqueous solvent and (b) a polymeric material, a precursor of the polymeric material, or combinations thereof. Any polymeric materials that are included in the dispersion composition typically are soluble in the non-aqueous solvent and form a coating that is colorless and transparent when viewed with the human eye. Likewise, any precursors of the polymeric materials that are included in the dispersion composition are soluble in a non-aqueous solvent and form a polymeric coating that is colorless and transparent when viewed with the unaided human eye. The polymeric material typically improves the durability of coatings prepared from the dispersion compositions.

Exemplary polymeric materials include, but are not limited to, polysiloxanes, fluoroelastomers, polyamides, polyimides, caprolactones, caprolactams, polyurethanes, polyvinyl alcohols, polyvinyl chlorides, polyvinyl acetates, polyesters, polycarbonates, polyacrylates, polymethacrylates, polyacrylamides, and polymethacrylamides. Suitable precursors of the polymeric material (i.e., precursor materials) include any precursor materials used to prepare the polymeric materials listed above. Exemplary precursor materials include acrylates that can be polymerized to polyacrylates, methacrylates that can be polymerized to form polymethacrylates, acrylamides that can be polymerized to form polyacrylamides, methacrylamides that can be polymerized to form polymethacrylamides, epoxy resins and dicarboxylic acids that can be polymerized to form polyesters, diepoxides that can be polymerized to form polyethers, isocyanates and polyols that can be polymerized to form polyurethanes, or polyols and dicarboxylic acids that can be polymerized to form polyesters.

The dispersion composition can also contain a surfactant (i.e., leveling agent), a polymerization initiator, and other additives, as known in the art.

The dispersion composition also includes a non-aqueous solvent. As used herein, the term "non-aqueous" means that no water is purposefully added to the compositions. However, a small amount of water might be present as an impurity in other components or might be present as a reaction by-product of a surface modification process or the polymerization process. The non-aqueous solvents are typically selected to be compatible (i.e., miscible) with the surface modifying agent added to the surface of the fluorescent semiconductor nanoparticles. Suitable non-aqueous solvents include, but are not limited to, aromatic hydrocarbons (e.g., toluene, benzene, or xylene), aliphatic hydrocarbons such as alkanes (e.g., cyclohexane, heptane, hexane, or octane), alcohols (e.g., methanol, ethanol, isopropanol, or butanol), ketones (e.g., acetone, methyl ethyl ketone, methyl isobutyl ketone, or cyclohexanone), aldehydes, amines, amides, esters (e.g., amyl acetate, ethylene carbonate, propylene carbonate, or methoxypropyl acetate), glycols (e.g., ethylene glycol, propylene glycol, butylene glycol, triethylene glycol, diethylene glycol, heylene glycol, or glycol ethers such as those commercially available from Dow Chemical, Midland, Mich. under the trade designation DOWANOL), ethers (e.g., diethyl ether), dimethyl sulfoxide, tetramethylsulfone, halocarbons (e.g., methylene chloride, chloroform, or hydrofluoroethers), or combinations thereof.

Various composite particles are provided.

Embodiment 1 is a composite particle comprising: a fluorescent semiconductor core/shell nanoparticle; and a phthalic acid derivative attached to the core/shell nanoparticle outer surface, wherein the phthalic acid derivative has the following Formula (I):

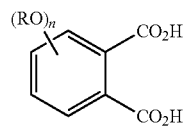

wherein each R is independently a linear or branched alkyl group having 6 or more carbon atoms; and n is 1 or 2.

Embodiment 2 is the composite particle of embodiment 1 wherein the core comprises a first semiconductor material and the shell comprises a second semiconductor material that is different than the first semiconductor material.

Embodiment 3 is the composite particle of embodiment 1 or 2 wherein the core comprises a metal phosphide or a metal selenide.

Embodiment 4 is the composite particle of embodiment 3 wherein the core comprises InP or CdSe.

Embodiment 5 is the composite particle of any of embodiments 1 through 4 wherein the shell comprises a zinc-containing compound.

Embodiment 6 is the composite particle of any of embodiments 1 through 5 wherein the shell is a multilayered shell.

Embodiment 7 is the composite particle of embodiment 6 wherein the multilayered shell comprises an inner shell overcoating the core, wherein the inner shell comprises zinc selenide and zinc sulfide.

Embodiment 8 is the composite particle of embodiment 7 wherein the multilayered shell comprises an outer shell overcoating the inner shell, wherein the outer shell comprises zinc sulfide.

Embodiment 9 is the composite particle of any of embodiments 1 through 8 wherein n is 1.

Embodiment 10 is the composite particle of any of embodiments 1 through 8 wherein n is 2.

Embodiment 11 is the composite particle of any of embodiments 1 through 10 wherein each OR group is the same.

Embodiment 12 is the composite particle of any of embodiments 1 through 11 wherein each R is independently a linear or branched alkyl group having up to 20 carbon atoms.

Embodiment 13 is the composite particle of embodiment 12 wherein each R is independently a linear or branched alkyl group having up to 15 carbon atoms.

Embodiment 14 is the composite particle of any of embodiments 1 through 13 wherein each R is independently a branched alkyl group.

Embodiment 15 is the composite particle of any of embodiments 1 through 14 wherein the phthalic acid derivative is liquid at room temperature.

Embodiment 16 is the composite particle of any of embodiments 1 through 15 wherein the phthalic acid derivative is soluble in a nonpolar organic solvent at room temperature in an amount of at least 1 wt-%.

Embodiment 17 is the composite particle of any of embodiments 1 through 16 wherein the phthalic acid derivative comprises a mixture of compounds of Formula (I).

Embodiment 18 is the composite particle of any of embodiments 1 through 17 wherein the phthalic acid derivative has the following Formula (II):

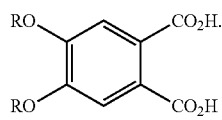

Embodiment 19 is the composite particle of any of embodiments 1 through 17 wherein the phthalic acid derivative has the following Formula (III):

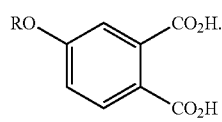

Embodiment 20 is the composite particle of any of embodiments 1 through 17 wherein the phthalic acid derivative is selected from:

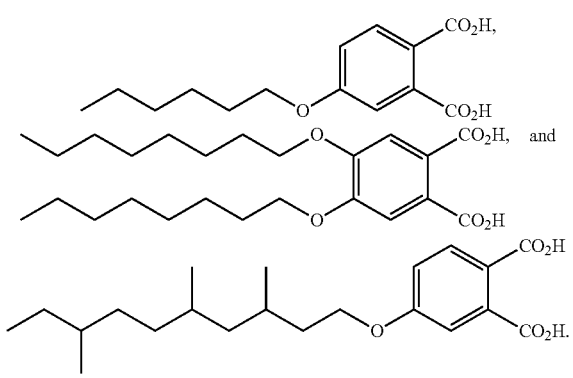

Embodiment 21 is a composite particle comprising: a fluorescent semiconductor core/shell nanoparticle comprising: an InP core; an inner shell overcoating the core, wherein the inner shell comprises zinc selenide and zinc sulfide; and an outer shell overcoating the inner shell, wherein the outer shell comprises zinc sulfide; and a phthalic acid derivative attached to the core/shell nanoparticle outer surface, wherein the phthalic acid derivative has the following Formula (I):

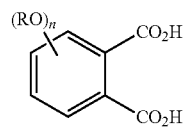

wherein each R is independently a linear or branched alkyl group having 6 or more carbon atoms; and n is 1 or 2.

Embodiment 22 is the composite particle of embodiment 21 wherein n is 1.

Embodiment 23 is the composite particle of embodiment 21 wherein n is 2.

Embodiment 24 is the composite particle of any of embodiments 21 through 23 wherein each OR group is the same.

Embodiment 25 is the composite particle of any of embodiments 21 through 24 wherein each R is independently a linear or branched alkyl group having up to 20 carbon atoms.

Embodiment 26 is the composite particle of any of embodiments 21 to 25 wherein each R is independently a linear or branched alkyl group having up to 15 carbon atoms.

Embodiment 27 is the composite particle of any of embodiments 21 through 26 wherein each R is independently a branched alkyl group.

Embodiment 28 is the composite particle of any of embodiments 21 through 27 wherein the phthalic acid derivative is liquid at room temperature.

Embodiment 29 is the composite particle of any of embodiments 21 through 28 wherein the phthalic acid derivative is soluble in a nonpolar organic solvent at room temperature in an amount of at least 1 wt-%.

Embodiment 30 is the composite particle of any of embodiments 21 through 29 wherein the phthalic acid derivative comprises a mixture of compounds of Formula (I).

Embodiment 31 is the composite particle of any one of embodiments 21 through 30 wherein the phthalic acid derivative has the following Formula (II):

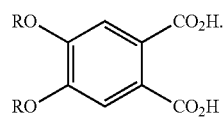

Embodiment 32 is the composite particle of any one of embodiments 21 through 30 wherein the phthalic acid derivative has the following Formula (III):

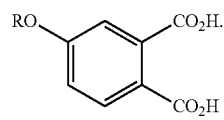

Embodiment 33 is the composite particle of any one of embodiments 21 through 30 wherein the phthalic acid derivative is selected from:

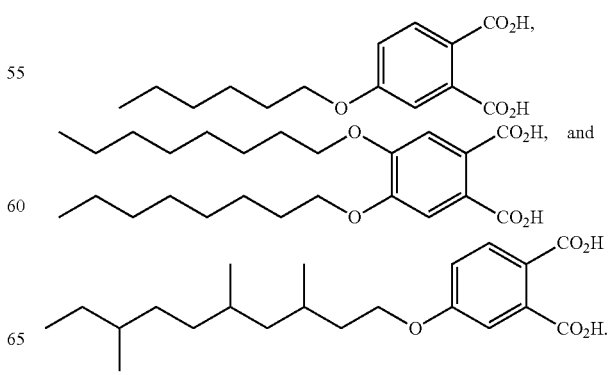

The following examples are provided to further illustrate the present invention and are not intended to limit the invention in any manner.

EXAMPLES

As used in the examples, all weights and percentages are by weight unless otherwise specified. All materials not specifically listed in the following table can be obtained from a supplier of chemicals such as Aldrich Chemical Company (Milwaukee, Wis., USA).

Materials

| Name | Description |
| --- | --- |
| EXXAL 13 | Trade designation for tridecyl alcohol. This material was obtained from ExxonMobil Chemical Company (Houston, TX, USA) and was used without further purification. EXXAL 13 contains a mixture of materials: up to 0.50 weight percent C8 or less alcohols, up to 2.0 weight percent C9 and C10 alcohols, and up to 10.0 weight percent C14 or greater alcohols. The hydroxyl number is in a range of 275 to 295 milligrams KOH/gram. The calculated percent alcohol is at least 98.5 weight percent. |
| Dimethyl 4-hydroxyphthalate | Obtained from Tokyo Chemical Industry (TCI) (Tokyo, Japan) and used without further purification. |
| 4-hexyloxyphthalic acid | Obtained from Rare Chemicals GmbH Schauenburgerstr (Kiel, Germany) and used without further purification. |
| 4,5-dioctyloxyphthalic acid | Obtained from Rare Chemicals GmbH Schauenburgerstr (Kiel, Germany) and used without further purification. |
| Dodecenylsuccinic acid (DDSA) | Obtained from Nanosys and used without further purification. |
| Green InP Nanocrystals in Toluene | Lot 321-93-3 obtained from Nanosys (Palo Alto, CA) and used without further purification. This is referred to as Stock Solution 1. |
| Green InP Nanocrystals in 1-Octadecene Solution | Lot 312-93-2 obtained from Nanosys (Palo Alto, CA) and used without further purification. This is referred to as Stock Solution 2. |

Example 1: 4-hexyloxyphthalic Acid

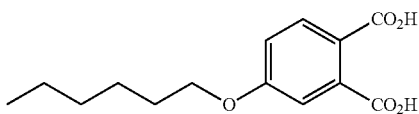

The solubility of 4-hexyloxyphthalic acid in toluene was greater than 1 weight percent based on a total weight of the solution.

The 4-hexyloxyphthalic acid was evaluated as a ligand for InP nanocrystals as described below.

Example 2: 4,5-dioctyloxyphthalic Acid

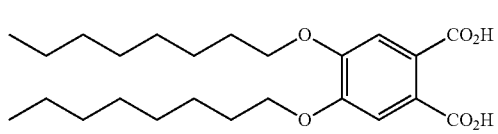

The solubility of 4,5-dioctyloxyphthalic acid in toluene was greater than 1 weight percent based on a total weight of the solution.

The 4,5-dioctyloxyphthalic acid was evaluated as a ligand for InP nanocrystals as described below.

Example 3: 4-(Tridecyloxy)phthalic Acid

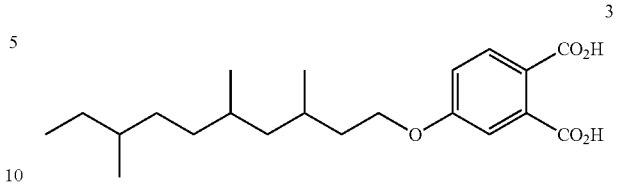

To 848 grams of a 48 weight percent solution (8.89 M) of hydrobromic acid (5.03 moles, 7 equivalents) was added 144 grams of EXXAL 13 alcohol (719 mmoles, 1 equivalent). There was a very slight exotherm. Then 147 grams of 96 weight percent sulfuric acid (1.44 moles, 2 equivalents) was added. This also caused an exotherm to 30° C. This mixture was heated to 100° C. and held for 20 hours. The crude reaction mixture was filtered to remove some solids. To the filtrate was added 1 L of ethyl acetate and the organic layer was washed with 1 L of saturated aqueous sodium chloride solution and then with 1 L of saturated aqueous sodium bicarbonate solution. The organic layer was dried with magnesium sulfate and concentrated. The residue was distilled at 90° C. and 0.5 torr to give 156 grams (82 percent yield) of the desired product, which was 1-tridecyl bromide.

A mixture of 15.0 grams of 1-tridecyl bromide (57.0 mmoles, 1 equivalents), as prepared above, 24.0 grams of 4-hydroxyphthalic acid dimethyl ester (114 mmoles, 2 equivalents), 47.2 grams of potassium carbonate (342 mmoles, 6 equivalents) and 2.84 grams of potassium iodide (17.1 mmoles, 0.3 equivalents) in 150 milliliters of DMF was heated to 90° C. and held for 20 hours. To the reaction mixture was added 300 mL of ethyl acetate and 500 mL of water. The organic layer was washed 2 more times with 300 mL of water and concentrated. The product was dimethyl 4-(1-tridecyloxy)phthalate.

To a mixture of 185 mL of methanol and 12.0 mL of a 19.1 M solution of sodium hydroxide diluted with 110 mL water was added 18 grams of dimethyl 4-(1-tridecyloxy)phthalate (45.9 mmoles, 1 equivalents) in 180 mL THF. The reaction mixture was stirred at 40° C. for 18 hours. The reaction mixture was cooled to room temperature. To the cooled reaction mixture was added 100 mL of water and 100 mL of ethyl acetate. The pH was adjusted to less than 1 with 25.2 mL of a 12 M solution of hydrochloric acid. Enough water was added to give a phase split. The organic layer was separated and washed with 100 mL of water and then 100 mL of a saturated aqueous solution of sodium chloride. The organic layer was concentrated to give 15.52 grams of product (92.8 percent yield).

The product was dissolved in 300 mL of toluene and the toluene was removed at 55° C. and 10 torr. This was repeated 3 more times. This final product, which is referred to as 4-(1-tridecyloxy)phthalic acid, was a complex mixture of isomers due to branching of the aliphatic chain as indicated by the carbon 13 NMR. The C13 NMR spectrum showed over 100 individual absorptions for the aliphatic carbons in the range from 7 ppm to 45 ppm.

The solubility of 4-(1-tridecyloxy)phthalic acid in toluene was much greater than 1 weight percent based on a total weight of the solution.

The 4-(1-tridecyloxy)phthalic acid was evaluated as a ligand for InP nanocrystals as described below.

Evaluation of Examples 1-3

Two different methods were used for preparing samples for quantum yield measurements. Examples 1 and 2 were evaluated using Method 1 while Example 3 was evaluated using Method 2.

Method 1: Examples 1 and 2

A toluene solution of the sample ligand to be evaluated was prepared using 15 milligrams of the sample ligand and 1.5 mL of toluene. To this solution was added 0.288 mL of the Stock Solution 1 (Green InP Nanocrystals in Toluene). This mixture was heated with stirring on a hot plate at a temperature of 90° C. for 1.5 hours and then allowed to cool to room temperature. Approximately 0.4 mL of this solution was diluted with 4 ml of toluene. This solution was placed in a 1 centimeter square cuvette and the quantum efficiency was measured in a Quantaurus spectrometer, which is an absolute PC quantum yield measurement system commercially available from Hamamatsu Photonics (Hamamatsu City, Japan).

The integrating sphere used to measure the quantum yield is shown schematically in FIG. 1. EXC refers to the excitation source and DE refers to the direct excitation from the excitation source. The direct excitation of the sample in the center results in fluorescence emission (FE) at a longer wavelength of light. IE refers to indirect excitation that includes scattered/reflected light and FE that scatters and re-excites the sample. The amount of fluorescence emission is measured using the detector (DET). The baffle in front of the detector allows the detector to measure only diffuse radiation.

A solution of each ligand of Example 1 and 2 was prepared by Method 1. A reference solution using DDSA as the ligand (Reference 1) was prepared using Method 1. The result reported in Table 1 is the ratio of the quantum yield of the example ligand solution (Example 1 or 2) divided by the quantum yield of Reference 1.

Method 2: Example 3

To 2 mL of Stock Solution 2 (Green InP Nanocrystals in1-Octadecene) was added 40 milligrams of the sample ligand to be evaluated and 80 milligrams of lauric acid. The resulting mixture was heated at 90° C. for 1.5 hours and then allowed to cool to room temperature. Approximately 0.08 mL of this solution was diluted with 4 mL of hexane. This solution was placed in a 1 cm square cuvette for measurement in the Quantaurus spectrometer, which is an absolute PC quantum yield measurement system commercially available from Hamamatsu Photonics (Hamamatsu City, Japan).

The integrating sphere used to measure the quantum yield is shown schematically in FIG. 1. EXC refers to the excitation source and DE refers to the direct excitation from the excitation source. The direct excitation of the sample in the center results in fluorescence emission (FE) at a longer wavelength of light. IE refers to indirect excitation that includes scattered/reflected light and FE that scatters and re-excites the sample. The amount of fluorescence emission is measured using the detector (DET). The baffle in front of the detector allows the detector to measure only diffuse radiation.

A solution of the ligand of Example 3 was prepared by Method 2. A reference solution using DDSA as the ligand (Reference 2) was prepared using Method 2. The results reported in Table 1 are the ratio of the quantum yield of the solution of the ligand of Example 3 divided by the quantum yield of Reference 2.

The green InP nanocrystals are fluorescent nanocrystals with size-tunable emission wavelengths. Three characteristics of the nanocrystals are crucial for display performance: peak emission wavelength, the width of the emission peak, and the quantum yield of the chromophore. The first two characteristics primarily affect the color gamut of the film; the quantum yield (referred to hereafter as "QY") is a quantitative measure of the efficiency of fluorescent emission of the nanocrystals. QY is defined as the ratio of the number of photons emitted as fluorescence to the number of photons absorbed by the nanocrystals, $$QY = \frac{N_{photons,emitted}}{N_{photons,absorbed}} \quad (1)$$

where $N_{photon,emitted}$ and $N_{photon,absorbed}$ are the total number of photons emitted and absorbed, respectively. It is this ratio that was measured.

Absolute QY measurements were performed in a modified integrating sphere using the Hamamatsu Quantaurus spectrometer. A schematic of the system is shown in FIG. 1. A sample in a cuvette was suspended in the center of sphere made of highly reflective (Lambertian scattering) material (in this case, Spectralon). The sample was then pumped with a light source of a given wavelength (440 nm). Some of this light was scattered from the sample, some was absorbed, and some was emitted as fluorescence from the sample. The scattered and re-emitted light was then reflected around the sphere, ensuring completely diffuse excitation conditions. The light was then collected in a collection optic and sent to diffraction grating and CCD array for spectral analysis.

The sphere was 'blanked' by inserting a sample cuvette containing only the solvent used to prepare the sample. This allowed collection of a spectrum of the excitation light used to pump the sample for fluorescence. The blank was used to calculate the total number of photons in the excitation beam. Care was required during this step, because the number of photons at a given wavelength dA is integrated to calculate quantum yield, not the total power at a given wavelength dA. This conversion was handled automatically in the integrating software, but the conversion factor between the number of photons and power (P) is given here for reference:

$$N_{photon}(\lambda) = P\left(\frac{\lambda}{hc}\right) \quad (2)$$

where P is optical power (Watts), h is Planck's constant (J-s), c is the speed of light (cm-s$^{-1}$), and $\lambda$ is the wavelength (cm).

After blanking, each sample (Reference 1, Reference 2, and Examples 1-3) was inserted and the measurement was repeated. The output spectrum from this measurement contained both the attenuated excitation peak after absorption from the sample, and a new peak was observed that corresponded to fluorescence emission from the sample. Again, the excitation peak was integrated, and the difference between the blank excitation peak and the sample excitation peak gave the total number of photons absorbed. The integrated emission peak likewise gave the total number of fluorescence photons. The quantum yield is thus expressed below:

$$QY = \frac{N_{photons,emitted}}{N_{photons,absorbed}} = \frac{\int_{emission,sample} P\left(\frac{\lambda}{hc}\right)d\lambda}{\int_{excitation,blank} P\left(\frac{\lambda}{hc}\right)d\lambda - \int_{excitation,sample} P\left(\frac{\lambda}{hc}\right)d\lambda}, \quad (3)$$

where the integration ranges refer to the sample and blank peaks. The difference between the excitation peaks at 440 nm corresponds to the denominator in equation (3). The small peak near 550 nm corresponded to the numerator in the above equation, and is a measure of the total fluorescence from the nanocrystal sample.

TABLE 1

Quantum Yield

| Example | Method | Quantum Yield (QY) relative to DDSA |
|---|---|---|
| 1 | 1 | 0.96 |
| 2 | 1 | 0.82 |
| 3 | 2 | 0.97 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A composite particle comprising:
   a fluorescent semiconductor core/shell nanoparticle; and
   a phthalic acid derivative attached to the core/shell nanoparticle outer surface, wherein the phthalic acid derivative has the following Formula (I):

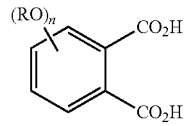

wherein:
   each R is independently a linear or branched alkyl group having 6 or more carbon atoms; and
   n is 1 or 2.

2. The composite particle of claim 1 wherein the core comprises a first semiconductor material and the shell comprises a second semiconductor material that is different than the first semiconductor material.

3. The composite particle of claim 1 wherein the core comprises a metal phosphide or a metal selenide.

4. The composite particle of claim 3 wherein the core comprises InP or CdSe.

5. The composite particle of claim 1 wherein the shell comprises a zinc-containing compound.

6. The composite particle of claim 1 wherein the shell is a multilayered shell.

7. The composite particle of claim 6 wherein the multilayered shell comprises an inner shell overcoating the core, wherein the inner shell comprises zinc selenide and zinc sulfide.

8. The composite particle of claim 7 wherein the multilayered shell comprises an outer shell overcoating the inner shell, wherein the outer shell comprises zinc sulfide.

9. The composite particle of claim 1 wherein the phthalic acid derivative is liquid at room temperature.

10. The composite particle of claim 1 wherein the phthalic acid derivative is soluble in a nonpolar organic solvent at room temperature in an amount of at least 1 wt-%.

11. The composite particle of claim 1 wherein the phthalic acid derivative comprises a mixture of compounds of Formula (I).

12. The composite particle of claim 1 wherein the phthalic acid derivative has the following Formula (II):

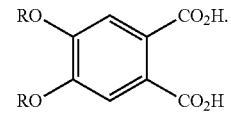

13. The composite particle of claim 1 wherein the phthalic acid derivative has the following Formula (III):

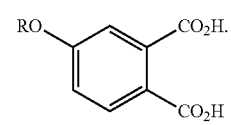

14. The composite particle of claim 1 wherein the phthalic acid derivative is selected from:

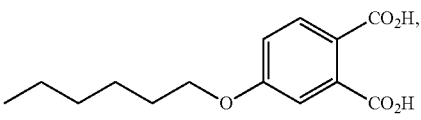

-continued

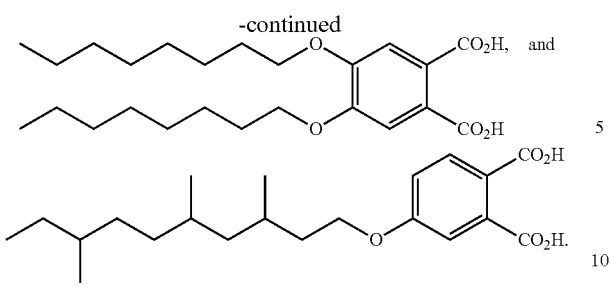

15. A composite particle comprising:
a fluorescent semiconductor core/shell nanoparticle comprising:
an InP core;
an inner shell overcoating the core, wherein the inner shell comprises zinc selenide and zinc sulfide; and
an outer shell overcoating the inner shell, wherein the outer shell comprises zinc sulfide; and
a phthalic acid derivative attached to the core/shell nanoparticle outer surface, wherein the phthalic acid derivative has the following Formula (I):

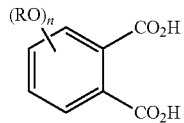

wherein:
each R is independently a linear or branched alkyl group having 6 or more carbon atoms; and
n is 1 or 2.

16. The composite particle of claim 15 wherein the phthalic acid derivative is liquid at room temperature.

17. The composite particle of claim 15 wherein the phthalic acid derivative is soluble in a nonpolar organic solvent at room temperature in an amount of at least 1 wt-%.

18. The composite particle of claim 15 wherein the phthalic acid derivative comprises a mixture of compounds of Formula (I).

19. The composite particle of claim 15 wherein the phthalic acid derivative has the following Formula (II):

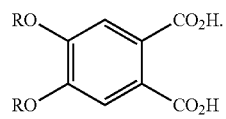

20. The composite particle of claim 15 wherein the phthalic acid derivative has the following Formula (III):

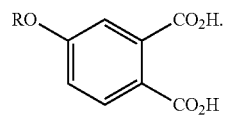

21. The composite particle of claim 15 wherein the phthalic acid derivative is selected from:

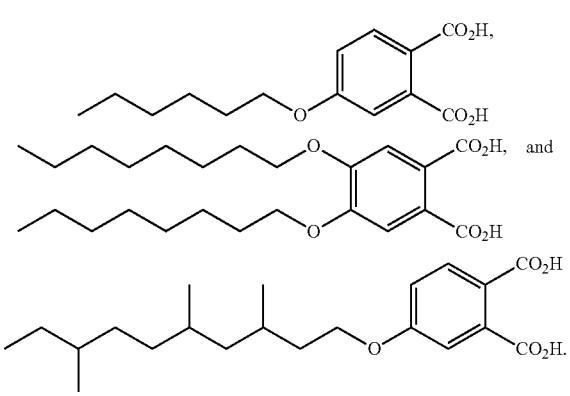

* * * * *